United States Patent
Takahashi et al.

(10) Patent No.: US 6,291,108 B1
(45) Date of Patent: Sep. 18, 2001

(54) NON-AQUEOUS ELECTROLYTE CELL (75) Inventors: Masatoshi Takahashi, Neyagawa; Seiji Yoshimura; Nobuhiro Furukawa, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/447,571

(22) Filed: Nov. 23, 1999

Related U.S. Application Data (63) Continuation of application No. 08/025,239, filed on Mar. 2, 1993, now abandoned, which is a continuation-in-part of application No. 07/769,401, filed on Oct. 1, 1991, now abandoned.

(30) Foreign Application Priority Data

Dec. 12, 1989 (JP) .................................................. 2-401667

(51) Int. Cl.[7] ........................... H01M 10/40; H01M 4/50; H01M 4/52
(52) U.S. Cl. ..................... 429/332; 429/218.1; 429/224
(58) Field of Search ............................... 429/332, 218.1, 429/224, 231.3

(56) References Cited

U.S. PATENT DOCUMENTS

| | | | |
|---|---|---|---|
| 4,048,403 | * | 9/1977 | Kronenberg ........................ 429/228 |
| 4,056,663 | * | 11/1977 | Schlaikjer . |
| 4,615,959 | * | 10/1986 | Hayashi et al. .................. 429/232 X |
| 4,957,833 | | 9/1990 | Daifuku ............................... 429/197 |
| 5,256,504 | * | 10/1993 | Okuno et al. . |
| 5,270,134 | * | 12/1993 | Tobishima et al. . |
| 5,523,443 | | 6/1996 | Okuno et al. ...................... 429/194 |

FOREIGN PATENT DOCUMENTS

| | | |
|---|---|---|
| 2016777 | 11/1990 | (CA) . |
| 2118400 | 3/1993 | (CA) . |
| 0312236 | 5/1988 | (EP) . |
| 2641130 | 12/1989 | (FR) . |
| 61-64082 * | 4/1986 | (JP) . |
| 2-010666 | 1/1990 | (JP) . |
| 2-267871 * | 2/1990 | (JP) . |

OTHER PUBLICATIONS

Patent Abstracts of Japan, vol. 14, No. 154 (E–907) [4097] Corresponding to Japanese 2–12777, Mar. 23, 1990.*
Patent Abstracts of Japan, JP2010666, Non–Aqueous Electrolyte Secondary Battery.

* cited by examiner

*Primary Examiner*—Stephen Kalafut
(74) *Attorney, Agent, or Firm*—Kubovcik & Kubovcik (57) ABSTRACT

A non-aqueous electrolyte cell includes a positive electrode, a negative electrode, and an electrolyte consisting of a solute and an organic solvent. The solvent is a solvent mixture of a cyclic carbonate and a non-cyclic carbonate.

16 Claims, 11 Drawing Sheets

NON-AQUEOUS ELECTROLYTE CELL

This application is a continuation of application Ser. No. 08/025,239, filed Mar. 2, 1993, which is a continuation-in-part of application Ser. No. 07/769,401, filed Oct. 1, 1991, now both abandoned.

BACKGROUND OF THE INVENTION

1. Field of the Invention

The present invention relates to a non-aqueous electrolyte cell comprising a positive electrode, a negative electrode and a non-aqueous electrolyte consisting of a solute and an organic solvent.

2. Description of the Prior Art

A non-aqueous electrolyte cell in which a negative electrode has lithium or a lithium alloy as an active material provides the advantages of high energy density and low self-discharge rate.

In this type of cell, a low boiling point solvent such as dimethoxyethane or dioxolane has been conventionally used as a solvent of an electrolyte. However, the solvent reacts with lithium, whereby a film, which is inactive and has a low conductivity, is formed on surfaces of the negative electrode. This causes the internal resistance of the cell to be increased, resulting in deterioration of storage characteristics (especially, a high rate discharge characteristic after storage).

In order to solve the above problem, it has been proposed to employ a solvent mixture of a cyclic carbonate and a low boiling point solvent to form a film of $Li_2CO_3$, which has a high conductivity on surfaces of the negative electrode, thereby improving the storage characteristics. However, this does not provide satisfactory storage characteristics.

OBJECTS AND SUMMARY OF THE INVENTION

An object of the present invention, therefore, is to provide a non-aqueous electrolyte cell capable of drastically improving a high rate discharge characteristic after storage as well as before storage.

Another object of the present invention is to provide a non-aqueous electrolyte cell capable of improving a charge and discharge cycle characteristic before and after storage when used as a secondary cell.

The above objects are fulfilled by a non-aqueous electrolyte cell comprising a positive electrode, a negative electrode, and an electrolyte consisting of a solute and an organic solvent, the cell being characterized in that the solvent is a solvent mixture of a cyclic carbonate and a non-cyclic carbonate.

The above objects are also fulfilled by a dischargeable non-aqueous electrolyte primary cell comprising a positive electrode; a negative electrode including either one of lithium and a lithium alloy; and a non-aqueous electrolyte consisting of a solute and an organic solvent, wherein the organic solvent is a solvent mixture of a cyclic carbonate and a non-cyclic carbonate.

The above objects are also fulfilled by a rechargeable non-aqueous electrolyte secondary cell comprising a positive electrode having a rechargeable substance as an active material; a negative electrode having lithium or a lithium alloy as an active material; and a non-aqueous electrolyte consisting of a solute and an organic solvent, wherein the organic solvent is a solvent mixture of a cyclic carbonate and a non-cyclic carbonate.

The above objects are fulfilled for the following reasons:

A storage characteristic in a non-aqueous electrolyte cell is deteriorated since a film having a low conductivity is generated by reaction between lithium and a solvent during long-term storage. When the solvent comprises a cyclic carbonate such as propylene carbonate or ethylene carbonate, a film of $Li_2CO_3$, which does not increase the internal resistance of the cell, is formed on the negative electrode, whereby the storage characteristic can be improved.

However, if the solvent consists of a cyclic carbonate only, the high rate discharge characteristic is deteriorated due to high viscosity of the electrolyte. Therefore, a solvent mixture of a cyclic carbonate and a low boiling point solvent having a low viscosity such as dimethoxyethane or dioxolane is generally used. However, such a solvent mixture also has the problem that reaction between lithium and the low boiling point solvent is inevitable after long term storage, although the high rate discharge characteristic is improved. The reaction forms an inactive film of $Li_2O$, whereby the high rate discharge characteristic is deteriorated after long term storage.

In order to solve the above problems, the present invention employs a solvent mixture of a cyclic carbonate and a non-cyclic carbonate having a low viscosity. In this case, the viscosity of the electrolyte becomes lower than that of the cyclic carbonate solvent, whereby the high rate discharge characteristic is improved. Moreover, since each carbonate forms a film of $Li_2CO_3$, the post-storage high rate discharge characteristic is further improved.

When the present invention is applied to a secondary cell the storage characteristic and the charge and discharge cycle characteristic are improved because of the formation of the film having a high conductivity.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF THE PREFERRED EMBODIMENTS

Embodiment I

EXAMPLE 1

Figure 1:
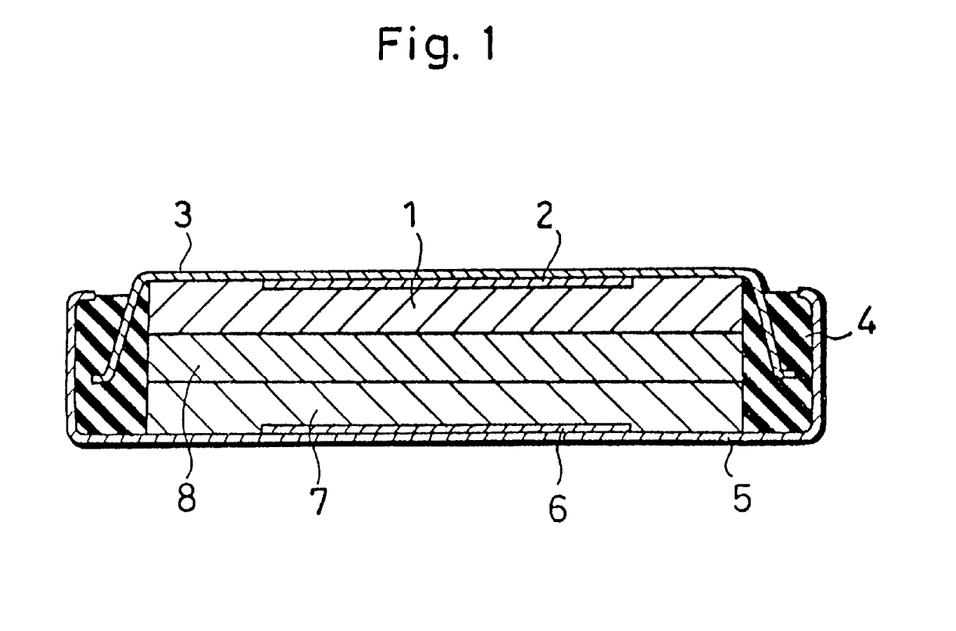
FIG. 1 is a sectional view of a flat type nonaqueous electrolyte cell according to an embodiment of the present invention.

FIG. 1 is a sectional view of a flat type nonaqueous electrolyte primary cell as an embodiment of the present invention.

The cell comprises a negative electrode 1 formed of lithium metal and pressed upon an inner surface of a negative collector 2. The negative collector 2 is secured to an inner bottom surface of a negative can 3 formed of ferritic stainless steel (SUS430). The negative can 3 is peripherally secured in an insulating packing 4 formed of polypropylene, while a positive can 5 is secured peripherally of the insulating packing 4. A positive collector 6 is secured to an inner bottom surface of the positive can 5. A positive electrode 7 is secured to an inner surface of the positive collector 6. A separator 8 impregnated with an electrolyte is disposed between the positive electrode 7 and the negative electrode 1.

The positive electrode 7 was produced as follows. First, manganese dioxide heat-treated in a temperature range of 350–430° C. acting as an active material, carbon powder acting as a conductive agent and fluororesin powder acting as a binder were mixed in a weight ratio of 85:10:5. Then, the mixture was molded under pressure and heat-treated at 250–350° C.

The negative electrode 1 was produced by punching a piece, having a predetermined size, out of a rolled plate of lithium.

The electrolyte was prepared by dissolving lithium phosphate hexafluoride in an equivalent volume solvent mixture of ethylene carbonate and dimethyl carbonate in 1 mol/lit.

The cell has a diameter of 20.0 mm, a height of 2.5 mm and a capacity of 130 mAh.

The cell manufactured as above is hereinafter referred to as Cell A.

COMPARATIVE EXAMPLE 1

A cell was manufactured in the same way as Example 1 except that a solvent of ethylene carbonate was employed instead of the solvent mixture of ethylene carbonate and dimethyl carbonate.

The cell manufactured as above is hereinafter referred to as Cell $X_1$.

COMPARATIVE EXAMPLE 2

A cell was manufactured in the same way as Example 1 except that an equivalent volume solvent mixture of ethylene carbonate and dimethoxyethane was employed instead of the solvent mixture of ethylene carbonate and dimethyl carbonate.

The cell manufactured as above is hereinafter referred to as Cell $X_2$.

[Experiment] 1

Figure 2:
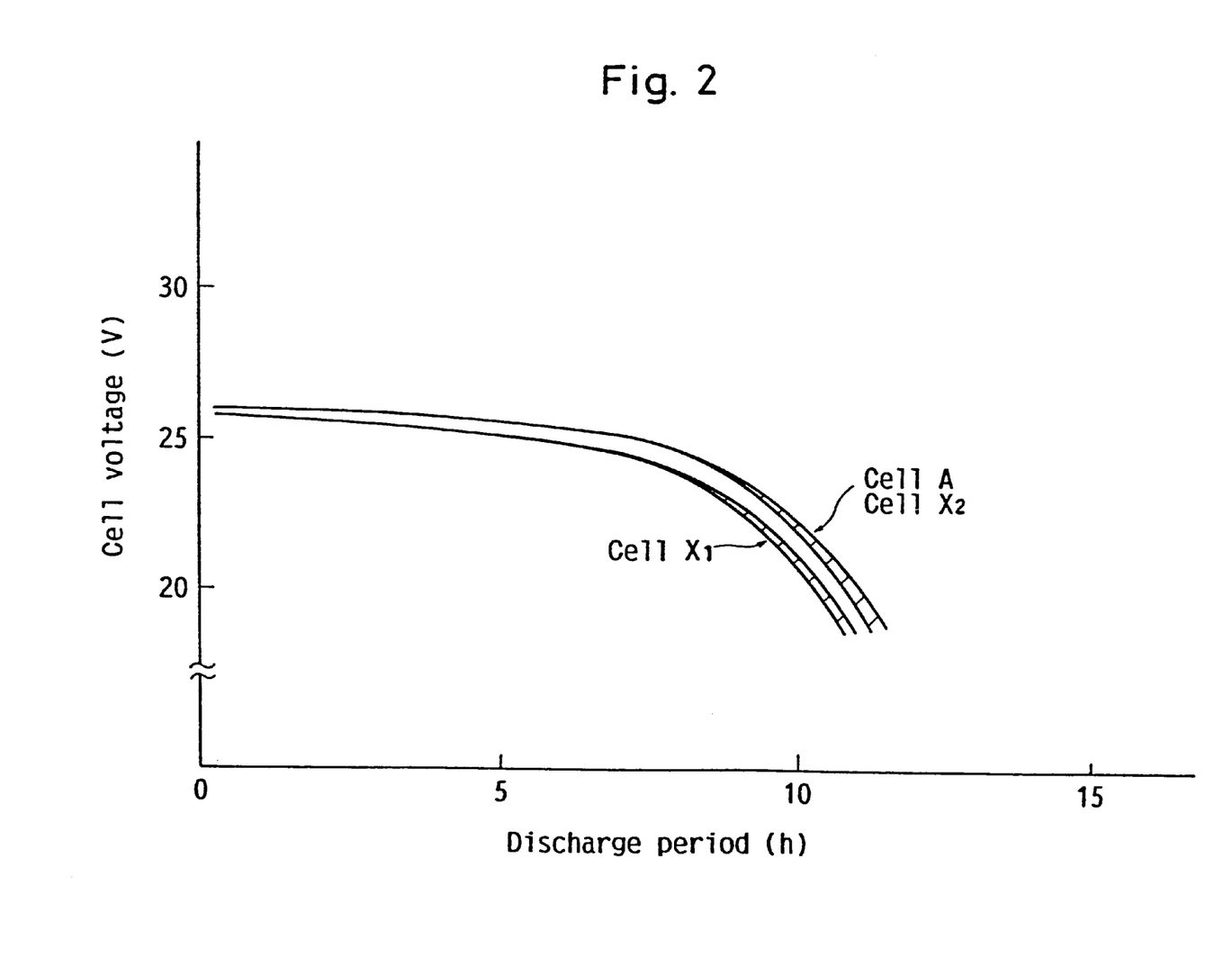
FIG. 2 is a graph showing the initial high rate discharge characteristic of Cell A according to the present invention and Comparative Cells $X_1$ and $X_2$.
Figure 3:
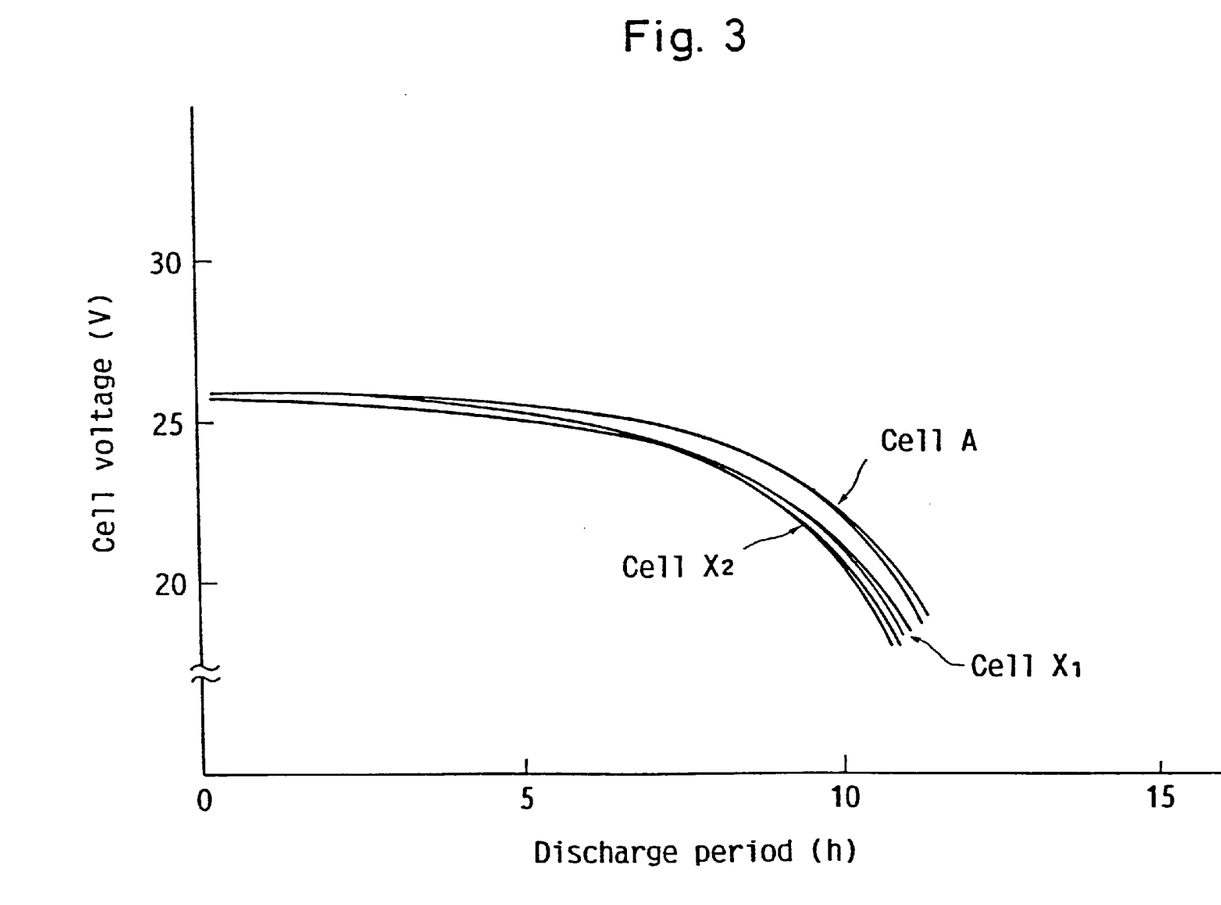
FIG. 3 is a graph showing the post-storage high rate discharge characteristics of Cells A, $X_1$ and $X_2$.

With respect to Cells A, $X_1$ and $X_2$, initial high rate discharge characteristics, immediately after cell assembly and post-storage high rate discharge characteristics, after the cells were stored for 3 months at 60° C., were checked. FIGS. 2 and 3 respectively show the results. The experiment was conducted under the condition that the cells were discharged with a constant resistance of 300 Ω at 25° C.

As apparent from FIGS. 2 and 3, Cell A according to the present invention is superior in both initial and post-storage high rate discharge characteristics. In contrast, Cell $X_1$ is excellent in the post-storage high rate discharge characteristic but is poor in the initial high rate discharge, whereas Cell $X_2$ is excellent in the initial high rate discharge characteristic but is poor in the post-storage high rate discharge characteristic.

This is considered due to the following reasons.

1) Comparative Cell $X_1$

Cell $X_1$ employs the solvent consisting of one cyclic carbonate (ethylene carbonate). Therefore, a film of $Li_2CO_3$ is formed by reaction between lithium of the negative electrode and the solvent as in Cell A of the present invention. This restricts deterioration of the post-storage high rate discharge characteristic. However, due to the high viscosity of the electrolyte, the initial high rate discharge characteristic is lowered.

2) Comparative Cell $X_2$

In Cell $X_2$, the solvent contains a low boiling point solvent (dimethoxyethane). This prevents the viscosity of the electrolyte from being heightened, thereby improving the initial high rate discharge characteristic. However, after long-term storage at a high temperature, the low boiling point solvent reacts with lithium, whereby an inactive film of $Li_2O$ is formed on surfaces of the negative electrode. As a result, the post-storage high rate discharge characteristic is lowered.

3) Cell A of the present invention

Since the solvent contains a non-cyclic carbonate (dimethyl carbonate), the viscosity of the electrolyte is prevented from increasing, resulting in improvement in the initial high rate discharge characteristic. Further, since a film of $Li_2CO_3$, which does not increase the internal resistance of the cell, is formed, deterioration of the high rate discharge characteristic after long-term storage is restricted.

[Experiment] 2

An optimum ratio range of ethylene carbonate and dimethyl carbonate was found by checking the relationship between the mixing ratio and discharge capacity. The experiment was conducted under the condition that a cell, manufactured in the same way as Cell A, was discharged with a constant resistance of 300 Ω at 25° C., after storage for 3 months at 60° C.

Figure 4:
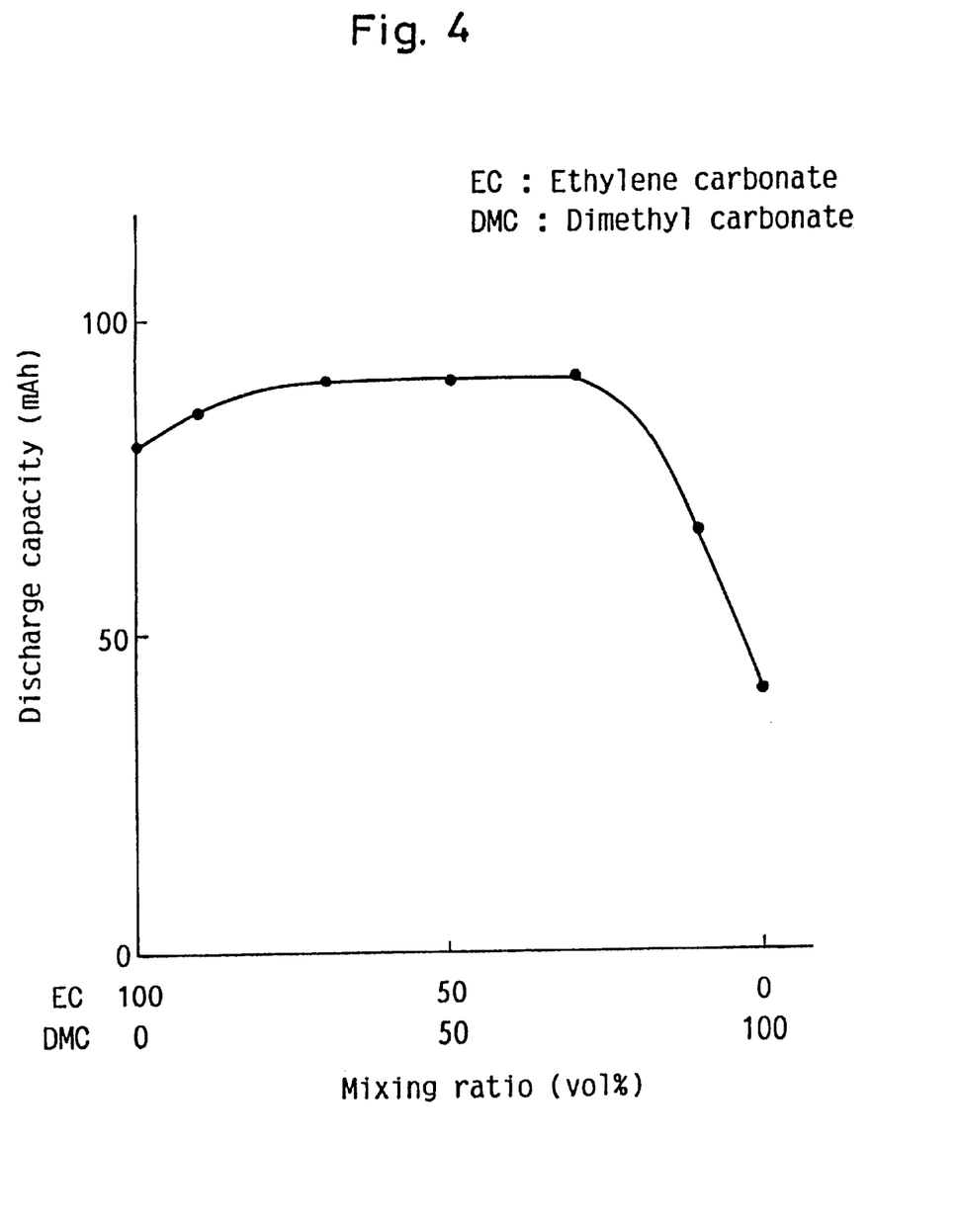
FIG. 4 is a graph showing the relationship between the mixing ratio of ethylene carbonate and dimethyl carbonate and discharge capacity.

As is apparent from FIG. 4, it is preferable that ethylene carbonate is contained in a range of 30–70 vol %.

[Experiment] 3

The optimum ratio range of ethylene carbonate and dimethyl carbonate, found in Experiment 2, above, by checking the relationship between the mixing ratio and discharge capacity, was also found when cell A was discharged with a constant resistance of 1 KΩ at 0° C., after being stored for 3 months at 60° C. The results are shown in FIG. 11.

Figure 11:
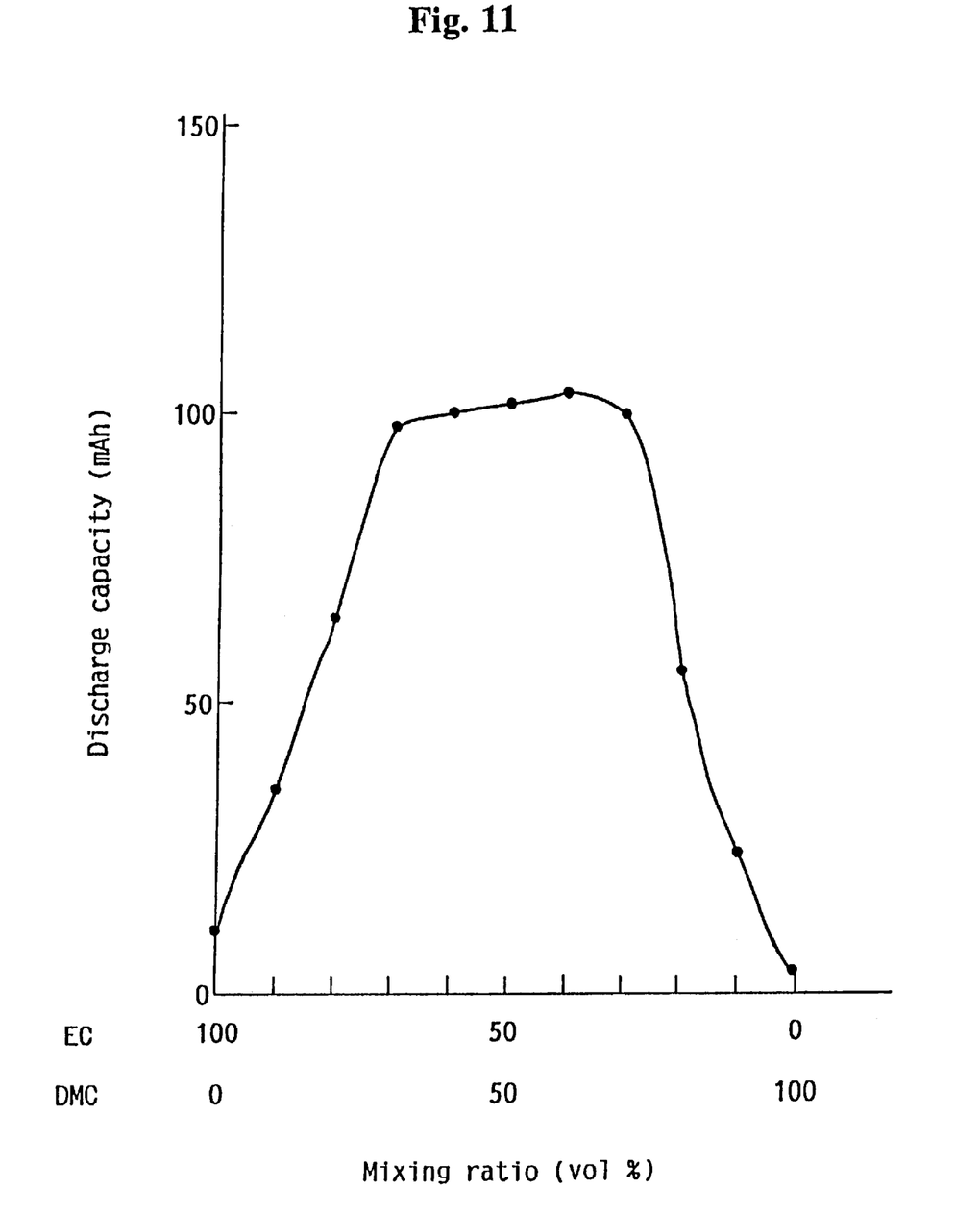
FIG. 11 is a graph showing the relationship between the mixing ratio of ethylene carbonate and dimethyl carbonate and discharge capacity of the cell.

As is apparent from FIG. 11, it is preferable that the ratio of the cyclic carbonate is 30–70 vol % and that the ratio of the non-cyclic carbonate is 70–30 vol %.

The above results are believed to be due to the following reasons.

1) Cyclic carbonates, such as ethylene carbonate, generally have a high freezing point. As a result, the viscosity of the electrolyte will increase even in a low temperature if the ratio of the cyclic carbonate is greater than 70%. Since the viscosity of the electrolyte increases at low temperatures, the electric conductivity of the electrolyte also decreases at low temperatures. As a result, the discharge capacity decreases. One advantage of using a cyclic carbonate in the solvent mixture is that lithium salt does not precipitate out, even at low temperatures, because lithium salt is highly soluble in cyclic carbonates.

2) Non-cyclic carbonates, such as dimethyl carbonate, have a lower freezing point than cyclic carbonates. As a result, the viscosity of the electrolyte is low at low temperatures. When the ratio of the non-cyclic carbonate is greater than 70 vol %, lithium salt will precipitate out at low temperatures because it is not very soluble in non-cyclic carbonates. As a result, the discharge capacity decreases at low temperatures.

The present invention uses 30–70 vol % cyclic carbonate and 70–30 vol % non-cyclic carbonate to prevent the viscosity of the electrolyte from increasing and to prevent the precipitation of lithium salt. Consequently, decreases, in the discharge capacity of the cell, are prevented at low temperatures.

Embodiment II

EXAMPLE 1

A cell was manufactured in the same way as Example 1 of Embodiment I except that lithium trifluoromethane sulfonate was employed as the solute and that an equivalent volume solvent mixture of propylene carbonate and dimethyl carbonate was employed as the solvent.

The cell manufactured as above is hereinafter referred to as Cell B.

[Comparative Cell] 1

A cell was manufactured in the same way as the above Example 1, except that a solvent of propylene carbonate was employed.

The cell manufactured as above is hereinafter referred to as Cell $Y_1$.

[Comparative Cell] 2

A cell was manufactured in the same way as the above Example 1 except that an equivalent volume solvent mixture of propylene carbonate and dioxolane was employed.

The cell manufactured as above is hereinafter referred to as Cell $Y_2$.

[Experiment]

Figure 5:
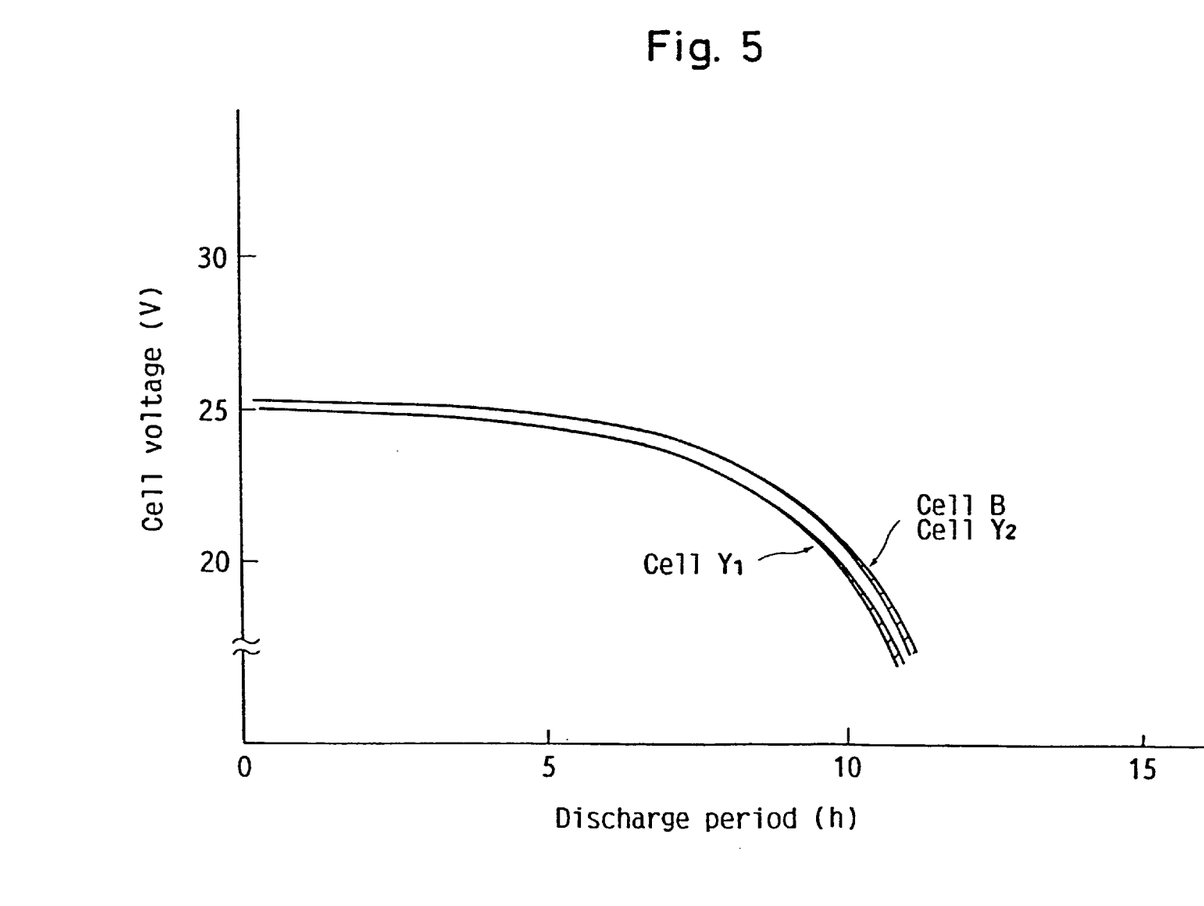
FIG. 5 is a graph showing the initial high rate discharge characteristics of Cell B according to the present invention and Comparative Cells $Y_1$ and $Y_2$.
Figure 6:
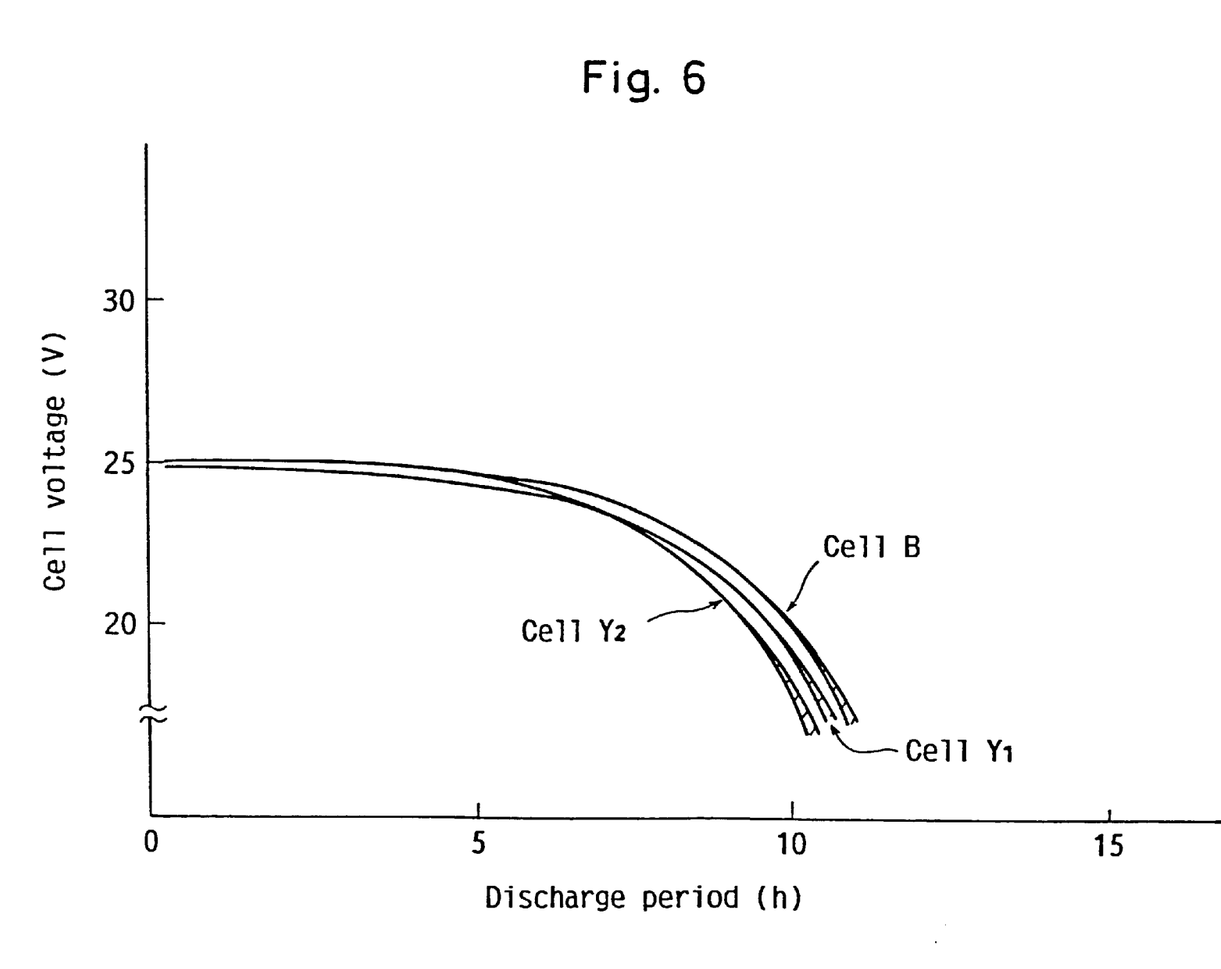
FIG. 6 is a graph showing the post-storage high rate discharge characteristics of Cells B, $Y_1$ and $Y_2$.

With respect to Cells B, $Y_1$ and $Y_2$, initial high rate discharge characteristics and post-storage high rate discharge characteristics were checked. FIGS. 5 and 6 show the results. The experiment conditions were the same as Experiment 1 of Embodiment I.

As is apparent from FIGS. 5 and 6, Cell B according to the present invention is superior in both initial and post-storage high rate characteristics. In contrast, Comparative Cell $Y_2$ is excellent in the initial high rate discharge characteristic but is poor in the post-storage high rate discharge characteristic. Comparative Cell $Y_1$ is excellent in the post-storage high rate discharge characteristic but is poor in the initial high rate discharge characteristic.

Embodiment III

EXAMPLE 1

In this embodiment, the present invention is applied to a secondary cell.

The secondary cell in this embodiment has substantially the same construction as the cell of FIG. 1 except for the kinds of active material used for the positive electrode and an electrolyte.

More specifically, rechargeable cobalt oxide is used as the active material for the positive electrode and the electrolyte is prepared by dissolving lithium phosphate hexafluoride in an equivalent volume solvent mixture of propylene carbonate and dimethyl carbonate in 1 mol/lit.

The cell manufactured as above is hereinafter referred to as Cell C.

COMPARATIVE EXAMPLE 1

A cell was manufactured in the same way as the above Example 1 except that a solvent of propylene carbonate was employed.

The cell manufactured as above is hereinafter referred to as Cell $Z_1$.

COMPARATIVE EXAMPLE 2

A cell was manufactured in the same way as the above Example 1 except that an equivalent volume solvent mixture of propylene carbonate and dimethoxyethane was employed.

The cell manufactured as above is hereinafter referred to as Cell $Z_2$.

[Experiment] 1

Figure 7:
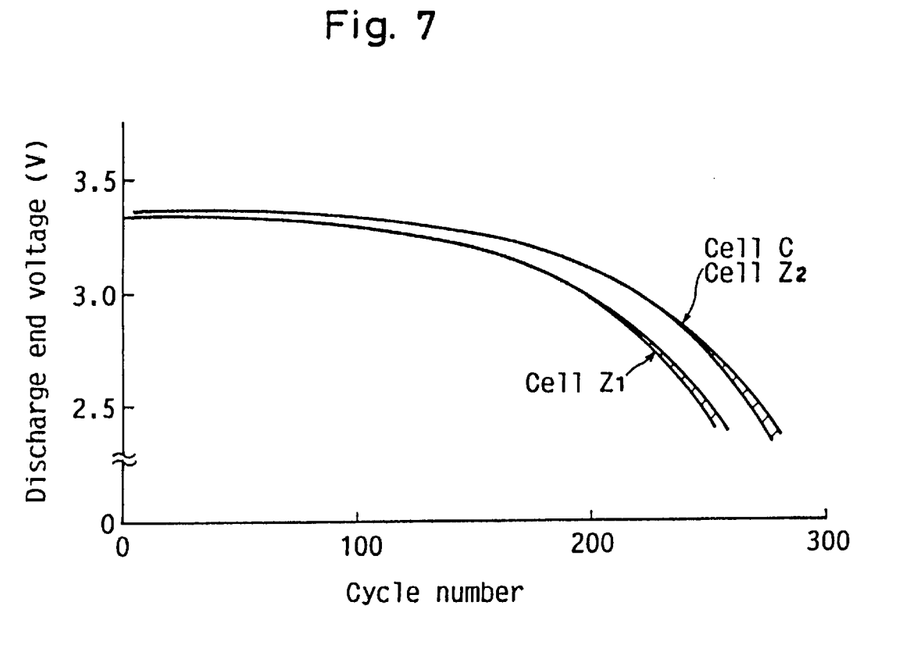
FIG. 7 is a graph showing the initial high rate discharge characteristics of Cell C according to the present invention and Comparative Cells $Z_1$ and $Z_2$.
Figure 8:
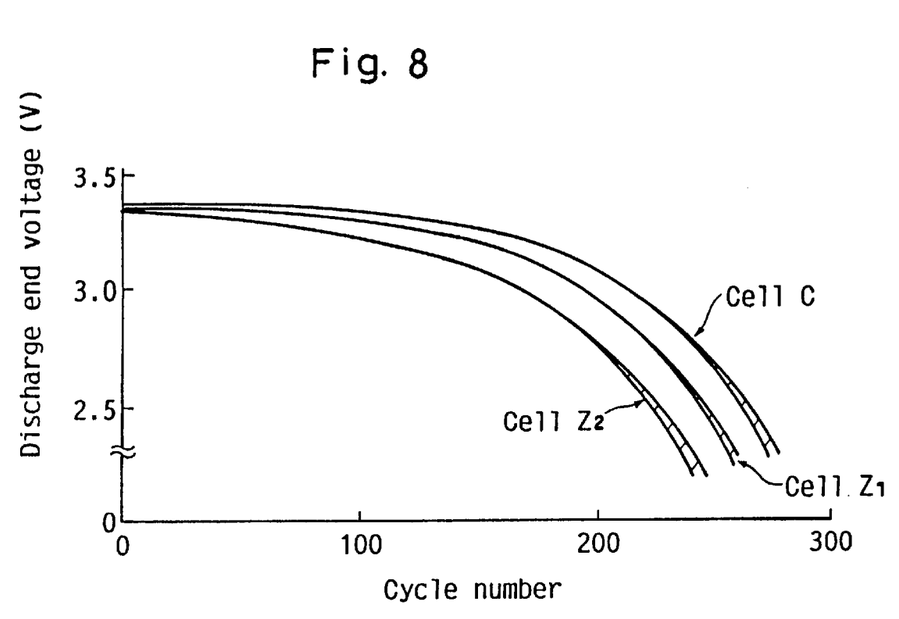
FIG. 8 is a graph showing the post-storage high rate discharge characteristics of Cells C, $Z_1$ and $Z_2$.

With respect to Cells C, $Z_1$ and $Z_2$, initial cycle characteristics, immediately after cell assembly, and post-storage cycle characteristics, after storage for 3 months at 60° C., were checked. FIGS. 7 and 8 respectively show the results. In the experiment, the cells were repeatedly charged with a charge current of 2 mA for 3 hours and discharged with a discharge current of 2 mA for 3 hours until the cell voltages drop to 2.5V.

As is apparent from FIGS. 7 and 8, Cell C according to the present invention is superior to Comparative Cells $Z_1$ and $Z_2$ in both initial and post-storage cycle characteristics.

[Experiment] 2

Figure 9:
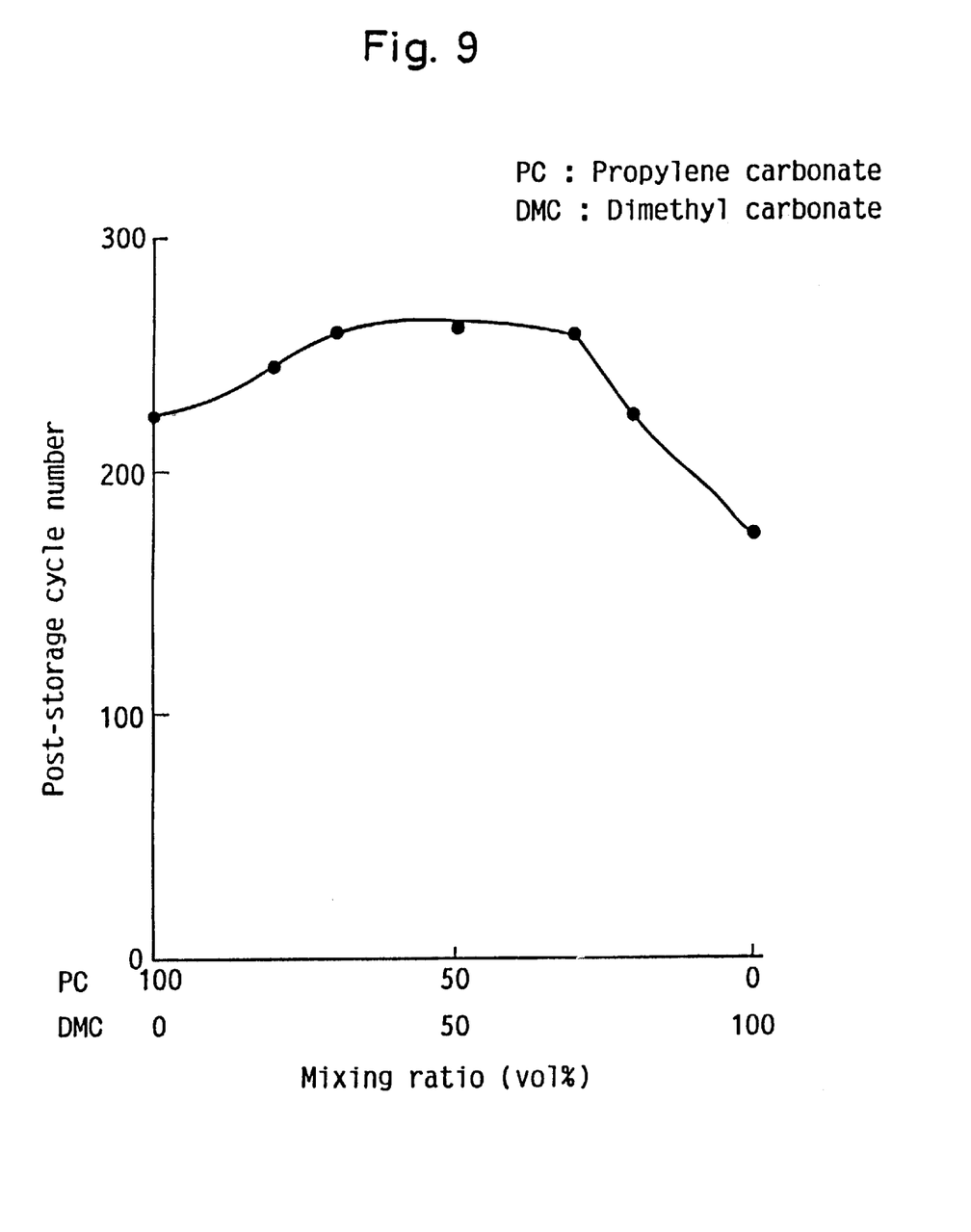
FIG. 9 is a graph showing the relationship between the mixing ratio of propylene carbonate and dimethyl carbonate and discharge capacity.

An optimum mixing ratio range of propylene carbonate and dimethyl carbonate was found by checking the relationship between the mixing ratio and the post-storage cycle number. FIG. 9 shows the result.

As is apparent from FIG. 9, it is preferable that propylene carbonate is contained in a range of 30–70 vol %.

EXAMPLE 2

A cell was manufactured in the same way as the above Example 1, except that a solvent mixture of ethylene carbonate, as a cyclic carbonate, and dimethyl carbonate, as the non-cyclic carbonate, was employed.

The cell manufactured as above is hereinafter referred to as Cell D.

[Experiment] 1

The relationship between the discharge capacity, or cycle life, of cell D and its mixing ratio was checked after it was charged for 3 hours at 2 mA, discharged for 3 hours at 2 mA, and stored for 3 months at 60° C. When the cell voltage reached 2.5V during the discharge operation, the cycle life was regarded as ended. The results are shown in FIG. 12.

Figure 12:
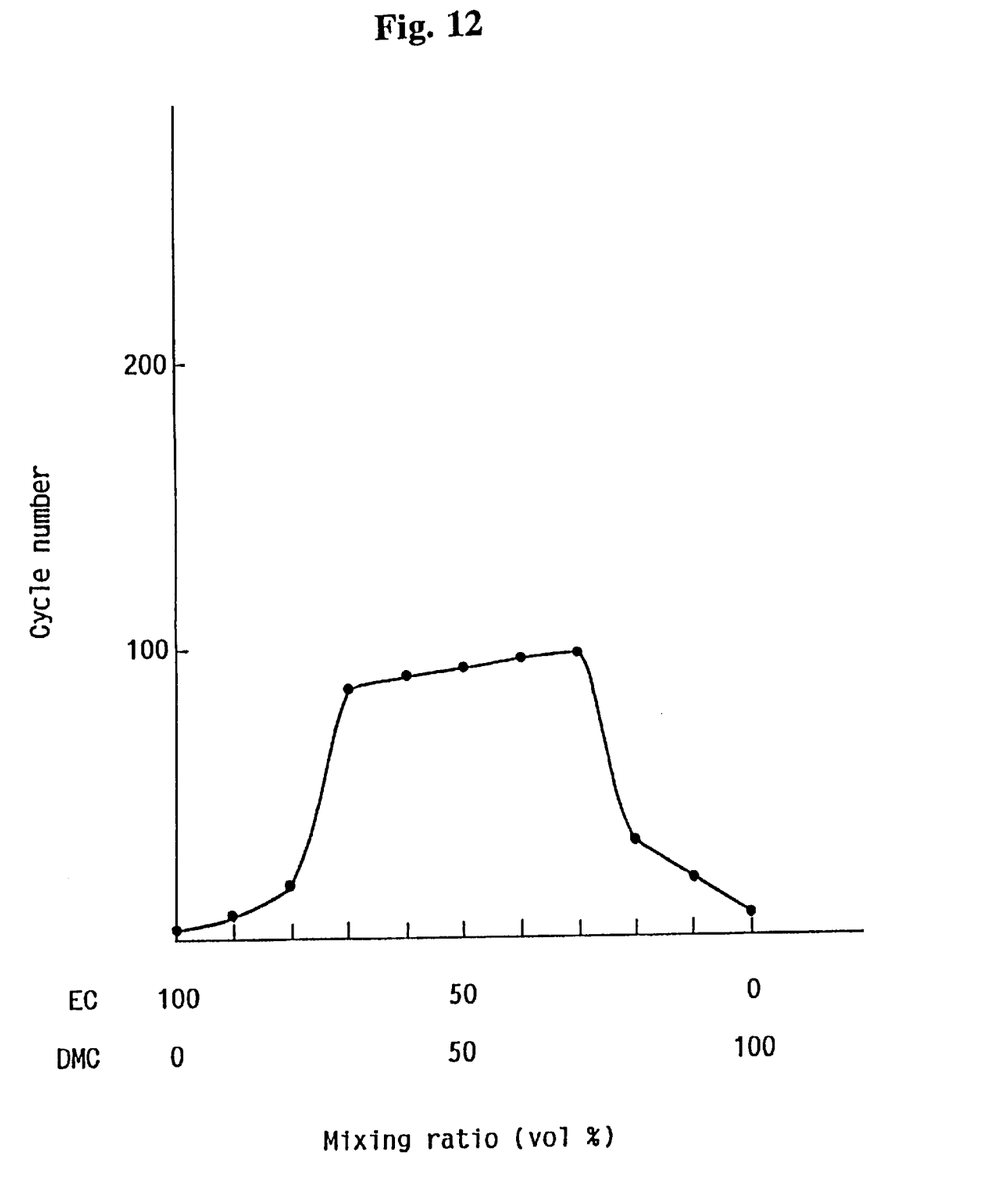
FIG. 12 is a graph showing the relationship between the mixing ratio of ethylene carbonate and dimethyl carbonate and discharge capacity, or life cycle, of the cell.

As is apparent from FIG. 12, it is preferable that the ratio of the cyclic carbonate is 30–70 vol % and that the ratio of the non-cyclic carbonate is 70–30 vol %.

The above results are believed to be due to the following reasons.

1) Cyclic carbonates, such as ethylene carbonate, generally have a high freezing point which causes the viscosity of the electrolyte to increase, even at low temperatures, if the ratio of the cyclic carbonate is greater than 70%. The electric conductivity of the electrolyte will decrease at low temperatures, since the viscosity of the electrolyte increases at low temperatures. As a result, the discharge capacity decreases. Lithium salt is highly soluble in cyclic carbonates and does not precipitate out of cyclic carbonates, even at low temperatures.

2) Non-cyclic carbonates, such as dimethyl carbonate, have a lower freezing point than cyclic carbonates, which results in the electrolyte having a low viscosity at low temperatures. When the ratio of the non-cyclic carbonate is greater than 70 vol %, lithium salt will precipitate out at low temperatures because it is not very soluble in non-cyclic carbonates. As a result, the discharge capacity decreases at low temperatures.

The present invention prevents the viscosity of the electrolyte from increasing and prevents the precipitation of lithium salt by using 30–70 vol % cyclic carbonate and 70–30 vol % non-cyclic carbonate. As a result, the discharge capacity of the cell is restrained from decreasing at low temperatures.

Embodiment IV

EXAMPLE 1

A cell was manufactured in the same way as Example 1 of Embodiment I except that the positive electrode is made of lithium cobalt oxide ($LiCoO_2$).

The cell manufactured as above is hereinafter referred to as Cell E.

[Experiment] 1

The relationship between the internal pressure of cell E and its mixing ratio was checked after it was stored for 10 days at 60° C., after being charged. The results are shown in FIG. 10.

Figure 10:
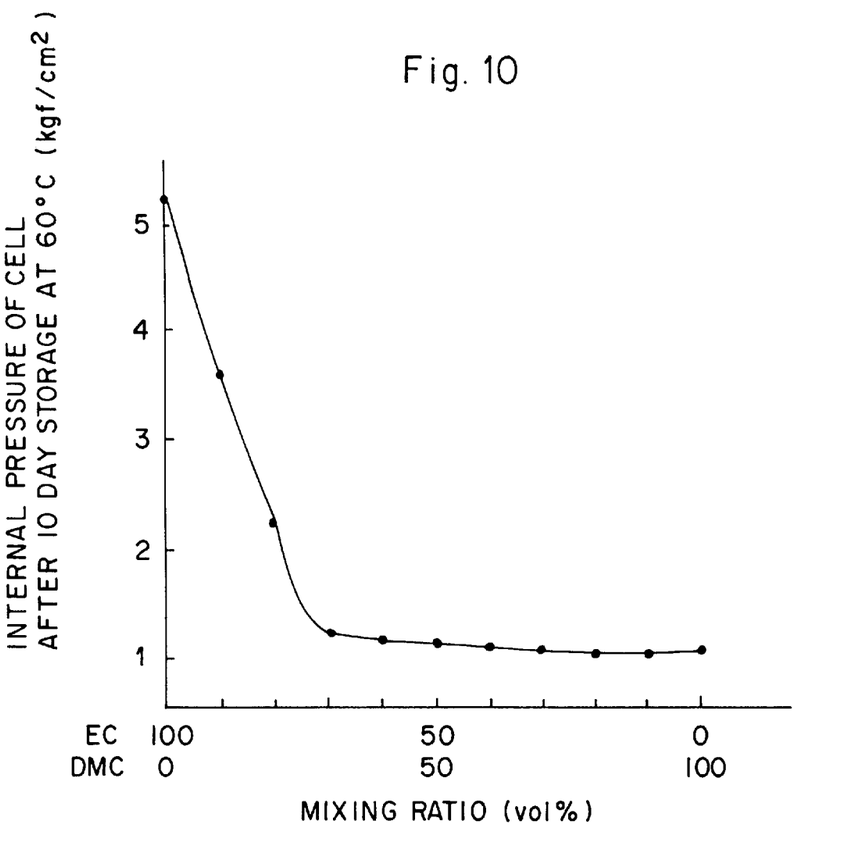
FIG. 10 is a graph showing the relationship between the mixing ratio of ethylene carbonate and dimethyl carbonate and internal pressure of the cell after storage.

As is apparent from FIG. 10, it is necessary that the ratio of the cyclic carbonate, here ethylene carbonate, is less than or equal to 70% to prevent the rise of the internal pressure of the cell. Referring to FIG. 10, the internal pressure of the cell rises at 60° C. due to the reaction between lithium cobalt oxide and ethylene carbonate. The reaction causes ethylene carbonate to decompose, which generates gas, and thus, increases the internal pressure of the cell. When the ratio of ethylene carbonate exceeds 70% the internal pressure of the cell increases suddenly. Accordingly, the present invention specifies a mixing ratio of the cyclic carbonate of not more than 70%, to prevent the internal pressure of the cell from significantly increasing.

The above-identified problem, with respect to sudden and significant increase of the internal pressure of a cell, only occurs when the positive electrode is made of an oxide, such as $LiCoO_2$. Thus, it is particularly important that the present invention uses a ratio of 70% or less of the cyclic carbonate, when the positive electrode is an oxide.

Other Points

In the above three embodiments, ethylene carbonate or propylene carbonate is employed as the cyclic carbonate. Other cyclic carbonates such as butylene carbonate, vinylene carbonate may also be employed.

In the above embodiments, dimethyl carbonate or diethyl carbonate is employed as the non-cyclic carbonate. Other non-cyclic carbonates such as methyl ethyl carbonate may also be employed.

The negative electrode is not limited to lithium metal but may be formed of a lithium alloy such as a lithium-aluminum alloy.

Although the present invention has been fully described by way of embodiments with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A non-aqueous electrolyte cell comprising:
   (a) a positive electrode which is a metal oxide comprising at least one of manganese and cobalt;
   (b) a negative electrode; and
   (c) a non-aqueous electrolyte consisting of a solute and an organic solvent wherein:
      (i) the solute is $LiPF_6$ and
      (ii) the solvent consists essentially of a mixture of 30–70 vol % of a cyclic carbonate and 70–30 vol % of a non-cyclic carbonate.

2. A non-aqueous electrolyte cell as claimed in claim 1, wherein the cyclic carbonate is selected from the group consisting of ethylene carbonate, propylene carbonate, butylene carbonate, and vinylene carbonate.

3. A non-aqueous electrolyte cell as claimed in claim 1 wherein the non-cyclic carbonate is selected from the group consisting of dimethyl carbonate, diethyl carbonate, and methyl ethyl carbonate.

4. A non-aqueous electrolyte cell as claimed in claim 1, wherein the negative electrode is composed of a material, said material being one of a lithium and a lithium alloy.

5. A non-aqueous electrolyte cell as claimed in claim 1, wherein the positive electrode is an oxide of cobalt.

6. A dischargeable non-aqueous electrolyte primary cell comprising:
   a positive electrode which is a metal oxide comprising at least one of manganese and cobalt;
   a negative electrode which is lithium or a lithium alloy;
   a non-aqueous electrolyte consisting of a solute and an organic solvent; wherein
   said solute is $LiPF_6$ and
   said solvent is a mixture consisting essentially of 30–70 vol % of a cyclic carbonate and 70–30 vol % of a non-cyclic carbonate.

7. A non-aqueous electrolyte primary cell as claimed in claim 6, wherein the cyclic carbonate is selected from the group consisting of ethylene carbonate, propylene carbonate, butylene carbonate, and vinylene carbonate.

8. A non-aqueous electrolyte primary cell as claimed in claim 6, wherein the non-cyclic carbonate is selected from the group consisting of dimethyl carbonate, diethyl carbonate, and methyl ethyl carbonate.

9. A non-aqueous electrolyte primary cell as claimed in claim 6, wherein the positive electrode includes manganese dioxide.

10. A non-aqueous electrolyte primary cell as claimed in claim 6, wherein the positive electrode is an oxide of cobalt.

11. A rechargeable non-aqueous electrolyte secondary cell comprising:
   a positive electrode which is an oxide having a rechargeable substance as an active material and comprises at least one of manganese and cobalt;
   a negative electrode which comprises lithium or a lithium alloy as an active material;
   a non-aqueous electrolyte consisting of a solute and an organic solvent; wherein
   said solute is $LiPF_6$ and
   said organic solvent is a mixture consisting essentially of 30–70% of a cyclic carbonate and 70–30 vol % of a non-cyclic carbonate.

12. A rechargeable non-aqueous electrolyte secondary cell as claimed in claim 11, wherein the cyclic carbonate is selected from the group consisting of ethylene carbonate, propylene carbonate, butylene carbonate, and vinylene carbonate.

13. A rechargeable non-aqueous electrolyte secondary cell as claimed in claim 11, wherein the non-cyclic carbonate is selected from the group consisting of dimethyl carbonate, diethyl carbonate, and methyl ethyl carbonate.

14. A rechargeable non-aqueous electrolyte secondary cell as claimed in claim 11, wherein the positive electrode includes cobalt oxide.

15. A rechargeable non-aqueous electrolyte secondary cell as claimed in claim 11, wherein the positive electrode is an oxide of cobalt.

16. A non-aqueous electrolyte cell comprising:

a positive electrode which is a cobalt oxide;

a negative electrode which is lithium;

a non-aqueous electrolyte consisting of a solute and an organic solvent; wherein said solute is $LiPF_6$ and said solvent is a mixture consisting essentially of about 50 vol % of propylene carbonate and about 50 vol % of dimethyl carbonate.

* * * * *